US007933796B1

(12) United States Patent
Buist, III et al.

(10) Patent No.: US 7,933,796 B1
(45) Date of Patent: Apr. 26, 2011

(54) METHOD OF AND SYSTEM FOR EVALUATING CREDIT RISK ASSOCIATED WITH A FINANCIAL ASSET

(75) Inventors: Henry Buist, III, McLean, VA (US); Yong Chul Joe, Washington, DC (US)

(73) Assignee: Fannie Mae, Washington, DC (US)

( * ) Notice: Subject to any disclaimer, the term of this patent is extended or adjusted under 35 U.S.C. 154(b) by 1047 days.

(21) Appl. No.: 11/265,769

(22) Filed: Nov. 2, 2005

Related U.S. Application Data (60) Provisional application No. 60/624,897, filed on Nov. 3, 2004.

(51) Int. Cl.
*G06F 17/30* (2006.01)
(52) U.S. Cl. ............................. 705/10; 705/35; 705/36 R
(58) Field of Classification Search .................... 705/10, 705/37
See application file for complete search history.

(56) References Cited

U.S. PATENT DOCUMENTS

| | | | | |
|---|---|---|---|---|
| 7,050,999 | B1 * | 5/2006 | Ota | 705/37 |
| 2002/0035520 | A1 * | 3/2002 | Weiss | 705/27 |
| 2002/0116303 | A1 * | 8/2002 | Hayashi | 705/35 |
| 2004/0030629 | A1 * | 2/2004 | Freeman et al. | 705/36 |
| 2004/0111363 | A1 * | 6/2004 | Trench et al. | 705/39 |
| 2004/0225597 | A1 * | 11/2004 | Oppenheimer et al. | 705/35 |
| 2006/0059073 | A1 * | 3/2006 | Walzak | 705/35 |
| 2007/0033123 | A1 * | 2/2007 | Navin | 705/35 |

OTHER PUBLICATIONS

Amemiya, "Advanced Econometrics", Harvard University Press, Cambridge, Massachusetts, Copyright © 1985 by Takeshi Amemiya (pp. 1-521).

Buist et al., "Pricing the Competing Risks of Mortgage Default and Prepayment in Stochastic Metropolitan Economies", *Managerial Finance*, vol. 24, No. 9/10, 1998 (pp. 110-128).
Buist et al., "Housing Finance in a Stochastic Economy: Contract Choice and Pricing", *Real Estate Economics*, vol. 28, No. 1, Spring 2000 (pp. 117-139).
Cox et al., "A Theory of the Term Structure of Interest Rates", *Econometrica*, vol. 53, No. 2., Mar. 1985 (pp. 385-407).
Kau et al., "The Valuation at Origination of Fixed Rate Mortgages with Default and Prepayment", *Journal of Real Estate Finance and Economics*, vol. 11, No. 1, Jul. 1995 (pp. 5-36).
Kau et al., "Default Probabilities for Mortgages", *Journal of Urban Economics*, vol. 35, 1994 (pp. 278-296).
Lancaster, "The Econometric Analysis of Transition Data", *Econometric Society Monographs*, Published by the Press Syndicate of the University of Cambridge, © Cambridge University Press, 1990 (pp. 3-352). Yang et al., "An Analysis of Ex Ante Probabilities of Mortgage Prepayment and Default", *Real Estate Economics*, vol. 26, No. 4, Winter 1998 (pp. 651-676).

* cited by examiner

*Primary Examiner* — Jagdish N Patel
*Assistant Examiner* — Kevin Poe
(74) *Attorney, Agent, or Firm* — Foley & Lardner LLP (57) ABSTRACT

A method of estimating credit risk associated with a financial asset includes receiving data regarding the asset and corresponding to a first date; determining a parameter using received data and the amount of time between the first date and a second date, the parameter being based on a predetermined estimate of the predictive value of received data with regard to a possible adverse event associated with the asset on the second date; and determining a probability of the adverse event as a function of the parameter. A system for estimating credit risk associated with a financial asset includes memory configured to store received data regarding the asset and a processor coupled to the memory and operable to execute programmed instructions, wherein the programmed instructions are configured to determine the parameter and the probability of the adverse event as a function of the parameter.

8 Claims, 8 Drawing Sheets

| Loan No. | Age | Pmt. Status | Forecast Period | Prior DLQ | Unseasoned | Default |
|---|---|---|---|---|---|---|
| 1010183860 | 1 | 0 | 0 | 0 | YES | 0 |
| 1010183860 | 2 | 0 | 1 | 0 | YES | 0 |
| 1010183860 | 3 | 0 | 1 | 0 | YES | 0 |
| 1010183860 | 4 | 0 | 3 | 0 | YES | 0 |
| 1010183860 | 5 | 0 | 4 | 0 | YES | 0 |
| 1010183860 | 6 | 0 | 1 | 0 | YES | 0 |
| 1010183860 | . | . | . | . | . | . |
| 1010183860 | 27 | 1 | 13 | 0 | NO | 0 |
| 1010183860 | 28 | 2 | 5 | 0 | NO | 0 |
| 1010183860 | 29 | 3 | 27 | 2 | YES | 0 |
| 1010183860 | 30 | 4 | 2 | 0 | NO | 0 |
| 1010183860 | 31 | 4 | 15 | 0 | NO | 0 |
| 1010183860 | 32 | 0 | 11 | 0 | NO | 0 |
| 1010183860 | 33 | 1 | 28 | 0 | YES | 0 |
| 1010183860 | 34 | 1 | 22 | 0 | NO | 0 |
| 1010183860 | 35 | 2 | 4 | 4 | YES | 0 |
| 1010183860 | 36 | 2 | 35 | 0 | NO | 0 |
| 1010183860 | 37 | 2 | 4 | 1 | NO | 0 |
| 1010183860 | 38 | 3 | 29 | 0 | YES | 0 |
| 1010183860 | 39 | 3 | 36 | 0 | NO | 0 |
| 1010183860 | 40 | 4 | 6 | 1 | YES | 0 |
| 1010183860 | 41 | 5 | 11 | 0 | NO | 0 |
| 1010183860 | 42 | 6 | 39 | 4 | YES | 0 |
| 1010183860 | 43 | 6 | 19 | 0 | NO | 0 |
| 1010183860 | 44 | 6 | 17 | 1 | NO | 0 |
| 1010183860 | 45 | 6 | 3 | 6 | NO | 0 |
| 1010183860 | 46 | D | 41 | 0 | YES | 1 |
| 1010185375 | 1 | 0 | 0 | 0 | YES | 0 |
| 1010185375 | 2 | 0 | 0 | 0 | YES | 0 |
| 1010185375 | . | . | . | . | . | . |

FIG. 4

| Loan No. | Age | Pmt. Status | Forecast Period | Prior DLQ | Unseasoned | Default |
|---|---|---|---|---|---|---|
| 1010183860 | 1 | 0 | 0 | 0 | YES | 0 |
| 1010183860 | 2 | 0 | 1 | 0 | YES | 0 |
| 1010183860 | 3 | 0 | 1 | 0 | YES | 0 |
| 1010183860 | 4 | 0 | 3 | 0 | YES | 0 |
| 1010183860 | 5 | 0 | 4 | 0 | YES | 0 |
| 1010183860 | 6 | 0 | 1 | 0 | YES | 0 |
| . | . | . | . | . | . | . |
| 1010183860 | 27 | 1 | 13 | 0 | NO | 0 |
| 1010183860 | 28 | 2 | 5 | 0 | NO | 0 |
| 1010183860 | 29 | 3 | 27 | 0 | YES | 0 |
| 1010183860 | 30 | 4 | 2 | 2 | NO | 0 |
| 1010183860 | 31 | 4 | 15 | 0 | NO | 0 |
| 1010183860 | 32 | 0 | 11 | 0 | NO | 0 |
| 1010183860 | 33 | 1 | 28 | 0 | YES | 0 |
| 1010183860 | 34 | 2 | 22 | 0 | NO | 0 |
| 1010183860 | 35 | 2 | 4 | 4 | YES | 0 |
| 1010183860 | 36 | 2 | 35 | 0 | NO | 0 |
| 1010183860 | 37 | 3 | 4 | 1 | YES | 0 |
| 1010183860 | 38 | 3 | 29 | 0 | NO | 0 |
| 1010183860 | 39 | 4 | 36 | 0 | YES | 0 |
| 1010183860 | 40 | 5 | 6 | 1 | NO | 0 |
| 1010183860 | 41 | 6 | 11 | 4 | NO | 0 |
| 1010183860 | 42 | 6 | 39 | 0 | YES | 0 |
| 1010183860 | 43 | 6 | 19 | 0 | NO | 0 |
| 1010183860 | 44 | 6 | 17 | 1 | NO | 0 |
| 1010183860 | 45 | 6 | 3 | 6 | NO | 0 |
| 1010183860 | 46 | 0 | 17 | 3 | NO | 1 |
| 1010185375 | 1 | 0 | 0 | 0 | YES | 0 |
| 1010185375 | 2 | 0 | 0 | 0 | YES | 0 |
| . | . | | | | . | . |

FIG. 5

DELINQUENCY TABLE — 602

FAST FORECLOSURE STATES — 602A

*CURRENT DELINQUENCY STATUS (months)*

| FORECAST TIME (months) | 0:Clean 12 | 0:dlg 12 | 1 | 2 | 3 | 4 to 6 | 7 to 9 | 9+ |
|---|---|---|---|---|---|---|---|---|
| (0,2] | DA1 | DA2 | DA3 | DA4 | DA5 | DA6 | DA7 | DA8 |
| (2,6] | DA9 | DA10 | DA11 | DA12 | DA13 | DA14 | DA15 | DA16 |
| (6,9] | DA17 | DA18 | DA19 | DA20 | DA21 | DA22 | DA23 | DA24 |
| (9,12] | DA25 | DA26 | DA27 | DA28 | DA29 | DA30 | DA31 | DA32 |
| (12,18] | DA33 | DA34 | DA35 | DA36 | DA37 | DA38 | DA39 | DA40 |
| (18,24] | DA41 | DA42 | DA43 | DA44 | DA45 | DA46 | DA47 | DA48 |
| (24,30] | DA49 | DA50 | DA51 | DA52 | DA53 | DA54 | DA55 | DA56 |
| (30,36] | DA57 | DA58 | DA59 | DA60 | DA61 | DA62 | DA63 | DA64 |
| (36, high] | DA65 | DA66 | DA67 | DA68 | DA69 | DA70 | DA71 | DA72 |

SLOW FORECLOSURE STATES — 602B

*CURRENT DELINQUENCY STATUS (months)*

| FORECAST TIME (months) | 0:Clean 12 | 0:dlg 12 | 1 | 2 | 3 | 4 to 6 | 7 to 9 | 9+ |
|---|---|---|---|---|---|---|---|---|
| (0,2] | DB1 | DB2 | DB3 | DB4 | DB5 | DB6 | DB7 | DB8 |
| (2,6] | DB9 | DB10 | DB11 | DB12 | DB13 | DB14 | DB15 | DB16 |
| (6,9] | DB17 | DB18 | DB19 | DB20 | DB21 | DB22 | DB23 | DB24 |
| (9,12] | DB25 | DB26 | DB27 | DB28 | DB29 | DB30 | DB31 | DB32 |
| (12,18] | DB33 | DB34 | DB35 | DB36 | DB37 | DB38 | DB39 | DB40 |
| (18,24] | DB41 | DB42 | DB43 | DB44 | DB45 | DB46 | DB47 | DB48 |
| (24,30] | DB49 | DB50 | DB51 | DB52 | DB53 | DB54 | DB55 | DB56 |
| (30,36] | DB57 | DB58 | DB59 | DB60 | DB61 | DB62 | DB63 | DB64 |
| (36, high] | DB65 | DB66 | DB67 | DB68 | DB69 | DB70 | DB71 | DB72 |

BANKRUPTCY TABLE — 604

| FORECAST TIME (months) | *BANKRUPT & DLQ90+* | |
|---|---|---|
|  | YES | NO |
| (0,2] | B1 | B2 |
| (2,6] | B3 | B4 |
| (6,9] | B5 | B6 |
| (9,12] | B7 | B8 |
| (12, high] | B9 | B10 |

METHOD OF AND SYSTEM FOR EVALUATING CREDIT RISK ASSOCIATED WITH A FINANCIAL ASSET

CROSS-REFERENCE TO RELATED APPLICATIONS

This application claims the benefit of U.S. Provisional Application No. 60/624,897, filed Nov. 3, 2004 and entitled "Method and System for Evaluating Credit Risk Associated With A Financial Asset," the entire content of which is hereby incorporated by reference.

BACKGROUND

The present description relates generally to systems and methods used to estimate credit risk pertaining to financial assets, such as loans, securities, and so forth. More particularly, the present description relates to a method and system for evaluating credit risk associated with a financial asset by determining the probability of an event in connection with the asset.

The financial services industry transacts billions of dollars every month. Such transactions typically include mortgage loans, auto loans, student loans, business loans, consumer credit cards, etc. As such, the ability to assess risks, such as credit risk, is important in the context of financial services. Credit risk refers to the possibility that a borrower will fail to pay a periodic debt obligation to a lender. For example, mortgage and auto loans may become delinquent for several months and lenders may eventually declare the loans in default. A defaulted loan or a delinquent loan is costly to the owner of the asset (initially the lender) when the default results in a loss on the loan.

Loan risk management requires forming expectations over the possible future payment outcomes such as delinquency levels, or final terminations as defaults or full repayments. As a lender improves its ability to determine risk associated with a loan, it can make better underwriting and pricing decisions that will result in fewer loans that become delinquent and/or end in a default resulting in a financial loss. In the secondary mortgage market, where mortgage loans are commonly sold to investors, fewer defaulted/delinquent loans results in lower losses and a better return on investment, resulting in increased capital flow to the housing market. Even for loans that have already been made to a borrower, better risk predictions allow more effective risk management strategies to be employed (e.g., more effective hedging or workout strategies) and, therefore, decrease vulnerability to losses due to defaults/delinquencies. Better risk predictions, therefore, decrease the defaults/delinquencies, improve capital flow to the housing market, and ultimately decrease mortgage costs for consumers.

A large number of factors may be used to assess risk associated with a loan, including borrower-specific risk factors, loan-specific risk factors, and property/collateral-specific risk factors. Borrower-specific risk factors may include factors such as the borrower's credit score as mentioned above, as well as other factors such as the borrower's income and financial reserves. Property-specific risk factors may include factors such as whether the property is owner-occupied. Loan-specific risk factors may include factors such as the loan-to-value ratio, the loan amount, the loan purpose, and so on.

In evaluating the credit risk associated with the loan, a lender or investor may use a mathematical model to form expectations over the possible future payment outcomes such as delinquency levels, defaults, etc. Determining these expectations in many applications may typically involve use of additional mathematical models in order to perform updated calculations or predictions of the transition over time of other parameters related to the probability of the adverse event, and may further involve simultaneously tracking several possible transition values of these parameters. For example, determining the probability of default and prepayment for a mortgage loan typically involves simultaneously tracking several potential delinquency states for the loan simultaneously, which are connected by a matrix of delinquency transition probabilities.

Calculating and tracking these various transition states may become computationally intensive and slow down the determination of the probability of the adverse event associated with the loan. Further, the pattern of transition states may provide little additional useful information in some business applications. Thus, there is a need for method and system for evaluating credit risk associated with a loan that is configured to determine the probability of an adverse event associated with a financial asset based on an initial observation of a parameter without requiring additional models to determine transition states for the parameter. There is further need for a method and system for evaluating credit risk associated with a loan that is configured to determine the probability of an adverse event associated with both seasoned and unseasoned mortgage loans.

SUMMARY

According to an exemplary embodiment, a method of evaluating credit risk associated with a financial asset includes receiving in a computerized system data regarding the financial asset and corresponding to a first date. The method also includes determining a parameter using received data and the amount of time between the first date and a second date. The parameter is based on a predetermined estimate of the predictive value of received data with regard to a possible adverse event associated with the financial asset on the second date. The method also includes determining a probability of the adverse event as a function of the parameter.

According to another exemplary embodiment, a system for evaluating credit risk associated with a financial asset includes memory configured to store received data regarding the financial asset and corresponding to a first date. The system also includes a processor coupled to the memory and operable to execute programmed instructions, wherein the programmed instructions are configured to determine a parameter using received data and the amount of time between the first date and a second date. The parameter is based on a predetermined estimate of the predictive value of received data with regard to a possible adverse event associated with the financial asset on the second date. The programmed instructions are also configured to determine a probability of the adverse event as a function of the parameter.

According to another exemplary embodiment, a method of evaluating credit risk associated with a mortgage loan includes determining a delinquency parameter value using a delinquency status observation for the mortgage loan. The delinquency parameter is based on an estimate of a decrease in the predictive value of the delinquency status observation with regard to a possible adverse event associated with the mortgage loan at a time subsequent to the time of the delinquency status observation. The method also includes determining a bankruptcy parameter value using a bankruptcy status observation for the mortgage loan. The bankruptcy parameter is based on an estimate of a decrease in the predictive value of the bankruptcy status observation with regard to the possible adverse event. The method also includes determining a probability of the adverse event as a function of the delinquency parameter and the bankruptcy parameter.

According to another exemplary embodiment, a method of evaluating credit risk associated with a mortgage loan includes receiving in a computerized system data regarding the mortgage loan and corresponding to a first date. The method also includes determining a parameter using received data and the amount of time between the first date and a second date to select the parameter from a plurality of predetermined parameters included in a mathematical model. The parameter is based on an estimate of the predictive value of received data with regard to a possible adverse event associated with the financial asset on the second date. The plurality of predetermined parameters are generated by sampling at least one of a delinquency status and a bankruptcy status from a plurality of mortgage loans at the beginning of a time interval, and by sampling the payment status of each of the plurality of financial assets with regard to the adverse event at the end of the time interval in order to estimate the predictive value of the sampled at least one of a delinquency status and a bankruptcy status with regard to the adverse event. The method also includes determining a probability of the adverse event as a function of the parameter.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION

Turning now to the FIGURES which illustrate exemplary embodiments in detail a method and system for evaluating credit risk associated with a financial asset are disclosed. The method and system is based on three components for performing risk management and predicting payment outcomes for a loan over time: the specification of a loan outcome model; the construction of a database and sampling scheme suitable for estimating the specified loan outcome model, and a system of implementation of the loan outcome model.

The method and system is configured to reduce the complexity of evaluating credit risk due to the potential for numerous possible loan payment outcomes. For example, given knowledge of a loan's characteristics and its payment behavior up to a given date, the lender may forecast the future probabilities of the various future loan payment outcomes. There are many of these outcomes because a loan with a delinquency level n at the beginning of a period can exit the period as delinquent anywhere from $\{0, 1, \ldots n, n+1\}$. For example, a loan entering a period as three months delinquent can exit the period anywhere between zero and four months delinquent. In addition to the delinquency statuses, the loan may be paid off (e.g., through prepayment) or enter default. The forecast typically continues for every possible future period over the loan's remaining term, generating potentially millions of permutations in outcome paths. When forecasting the performance of a large portfolio of loans, the need for a method and system for evaluating credit risk having reduced complexity is even more pronounced.

The nature of a loan's outcome process typically corresponds to the most general class of Markov chains and involves discrete payment outcomes on discrete payment dates, each having an associated probability. The loan outcome process may be considered non-homogenous in the sense that different characteristics of loans influence outcome probabilities. The loan outcome process may also be considered non-stationary in the sense that the outcome probabilities vary as the age of the loan changes. The loan outcome process may also be considered a high-order system in the sense that previous delinquencies will influence future loan outcome probabilities.

The method and system for evaluating credit risk reduces the complexity of the loan outcome model by recognizing that the pattern of the delinquency statuses is typically not determinant of the loss to the lender. Rather it is the loan termination status (e.g., repayment or default) as well as any financial recovery that determines the amount of financial loss. A model of delinquency status transitions typically adds no new information to what was known at the beginning of the forecast, and only traces out plausible patterns a loan might possibly follow to reach termination as a default or repayment. As such, this pattern of delinquencies does not need to be modeled for many business applications, and is excluded from the method and system to avoid slowing down implementation.

The method and system for evaluating credit risk associated with a financial asset accommodates the corresponding general Markov conditions while offering a practical estimation and implementation. Given the exclusion of delinquency transition state details, the method and system utilize a database construction configured to estimate future default and prepayment probabilities. The system and method also utilizes a sampling scheme configured to reduce the size of the constructed database. The method and system also utilizes an implementation scheme that determines future probabilities of default or prepayment using only information available at the forecast date. For example, at an arbitrary future date t measured from the forecast date (e.g., in months) the loan outcome model predicts the probability of default or prepayment at future date t given that the loan in question had delinquency level n observed t months ago (i.e., at the forecast date). The system and method allow both n and t to be arbitrary, and may be used by, for example, any credit provider of collateralized and uncollateralized loans.

According to an exemplary embodiment, the system is configured to make loan outcome predictions of, for example, default and prepayment, at a future date looking back to what was known only at the beginning of the forecast and without employing intermediate transition models, such as delinquency transition models. The system uses a variety of information available at the time of forecast to determine the probability of a future event associated with a financial asset, such as a default or repayment associated with the loan. The available information may include, for example, a delinquency status for the loan, a bankruptcy status for the loan, other recent payment information, etc. The system uses a mathematical model to determine one or more parameters using the available information. The system maps the effect of the decay in the predictive value of the available information over time on the probability of the adverse event as the forecast of the future adverse event moves forward in time. By mapping the effect of the decay in the predictive value of the available information over time, the system avoids the need for additional mathematical models to determine transition states for the parameter (e.g., delinquency transition states). The system is further configured to determine the probability of a future event for both seasoned and unseasoned loans.

By estimating parameters for any history of statuses at the time of forecast, the high order system conditions identified above may be explicitly treated and tested by the system. By transposing the panel data structure of a loan into individual observations (e.g., loan-month observations), the non-homogeneity and non-stationarity conditions identified above are also accommodated, resulting in a practical solution for evaluating loan credit risk associated with a financial asset. The system and method are generally applicable to any credit market using typical information held by creditors.

An exemplary generic lender's forecast of future loan performance will now be described with reference to loans with monthly payments and known terms to maturity. For an arbitrary loan, $l_t$ denotes the remaining loan amount, T denotes the loan term in months, and $x_t$ denotes static and time-varying information available for the loan up to date t. Assuming no periodic prepayments, the loan's amortization schedule can be used to compute the series of remaining principle, $\{l_t\}_{t=1}^T$, after $t \leq T$ payments.

To forecast future loan performance, future probabilities $P_t^d$ of default and $P_t^p$ payoff at date t, conditional on the information available at the time of forecast (e.g., t=0) are estimated. Future loan outcomes depend on economic factors that would influence borrower behavior. For example, whether mortgage loans prepay or default may depend on interest rate and home price changes from the time the loan was originated. These economic factors may be generated using, for example, Monte Carlo simulations. To denote the simulated factors, $\epsilon_t$ denotes the future economic factors at time t associated with the loan.

Loans at the start of the forecast may be current, or delinquent at a level n>0. When n exceeds some threshold set by the lender, the loan may be considered in default. Additionally, some delinquent borrowers may voluntarily terminate the loan by prepaying the remaining loan balance h.

An econometric model is developed to estimate parameters that govern default and payoff probabilities. Let $\Phi_0$ represent a loan information set at a forecast date t=0. $\Phi_0$ may include the complete payment history of the loan, $x_0$, $\epsilon_0$, and any other relevant information. Let $\beta$ be the parameter vector influencing defaults and prepayments. Given the future t>0, a system of probabilities predicting date t outcomes conditional on $\Phi_0$ known at the forecast date t=0 and on subsequent simulations is given by:

$$P_t^d(x_t, \epsilon_t; \beta | \Phi_0) \text{ and } P_t^p(x_t, \epsilon_t; \beta | \Phi_0) \quad (1)$$

whose parameters $\beta$ may be estimated using a variety of techniques. An exemplary technique is to assume sequentiality. By way of example, assume a borrower's payoff decision precedes the lender's default decision. This assumption allows $P_t^d$ to be estimated as a binary logit model. Binary logit modes are widely used in the credit and financial services industries and are typically feasible to apply to large numbers of observations.

Using these probabilities of future loan outcomes, the lender may perform numerous risk management functions, including, for example, loan pricing, mitigation of loan losses, portfolio rebalancing and capital allocation. For example, the lender may further estimate future loan acquisitions from an aggregate time series analysis of purchased loan volumes. Simulation of interest rates and house prices may be imposed by a scenario assumption or may be modeled after standard stochastic techniques. Further, the periodic contributions of defaulting loans to realizes losses may be based on accounting rules and linear regression estimates of the amounts of loss at the relevant dates. Aggregating these losses at each future date may then provide a view of expected loss distributions over the entire loan portfolio.

Figure 1:
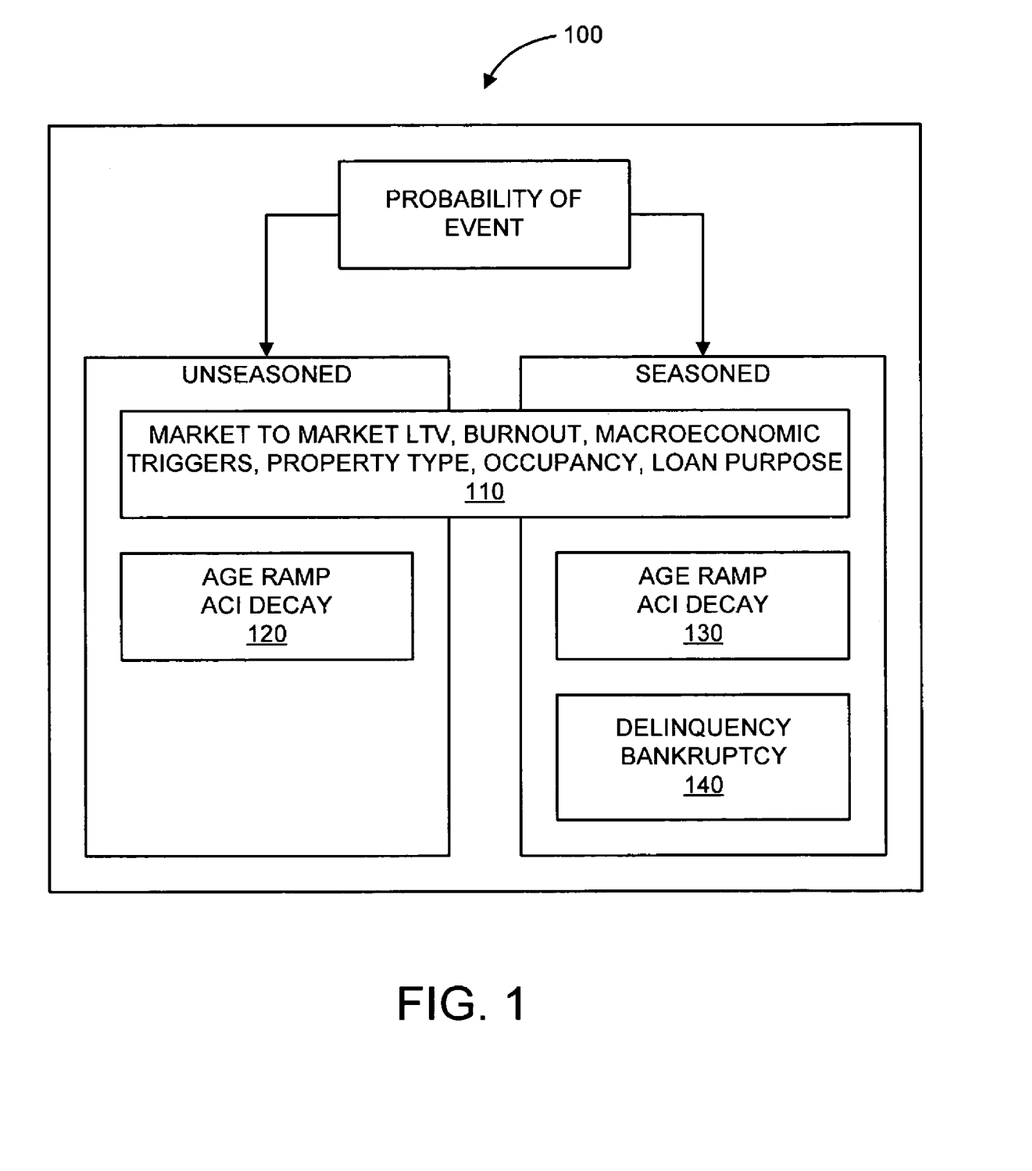
FIG. 1 diagrammatically illustrates a mathematical model which may be used to evaluate credit risk associated with a financial asset according to an exemplary embodiment.

FIG. 1 diagrammatically illustrates a mathematical model 100 which may be used with the method and system to evaluate credit risk associated with a financial asset according to an exemplary embodiment. In order to evaluate the credit risk associated with the financial asset, model 100 is generally configured to determine the probability of a future event associated with the financial asset. For example, the future event may be an adverse event associated with the financial asset such as future default, prepayment, etc. The term "default" as used herein refers to the nonpayment of a loan in accordance with the terms as specified in the note. The term "prepayment" as used herein refers to the payment of all or part of a loan debt before it is due. More particularly, model 100 is configured to evaluate the credit risk associated with a mortgage loan by determining the probability of a future default associated with the mortgage loan. While model 100 is primarily described herein in the context of a default model for mortgage loans, it should be understood that models for other types of events associated with various other types of loans or financial assets are also contemplated.

As shown in FIG. 1, model 100 is generally applicable to both seasoned loans and unseasoned loans. A "seasoned" loan is a loan for which a certain amount of payment information exists beyond origination of the loan (e.g., six months, one year). An example of a seasoned loan is a mortgage loan having twelve months or more of monthly payment information since origination. The term "unseasoned" loan refers to a loan which does not have the requisite amount of payment information, such as, for example, a mortgage loan with less than twelve months of monthly payment information.

Model 100 utilizes a number of parameters to determine the probability of a future default associated with the mortgage loan. The actual parameters used by model 100 depend on whether the loan is a seasoned loan or an unseasoned loan. Certain types of parameters may be used for both seasoned and unseasoned loans. Examples include the Market to Market LTV, Burnout, Macroeconomic Triggers, Property Type, Occupancy, and Loan Purpose parameters 110 shown in FIG. 1. Other parameters may be used for both types of loans, but calculated differently depending on whether the loan is a seasoned loan or an unseasoned loan. Examples include the Age Ramp and ACI Decay parameters 120 and 130 as shown in FIG. 1. Yet other types of parameters may be used for seasoned loans only, such as the Delinquency and Bankruptcy parameters 140 shown in FIG. 1. According to other exemplary embodiments, additional, fewer, or differing parameters may be used depending on the particular type of loan, financial asset or future event at issue. Thus, while some parameters may by relevant to the determination of a probability of a future default for a mortgage loan, other parameters may be relevant to the determination of a probability of future prepayment for a mortgage loan, or another type of financial asset.

For unseasoned loans, model 100 utilizes the Market to Market LTV, Burnout, Macroeconomic Triggers, Property Type, Occupancy, and Loan Purpose parameters 110 and the Age Ramp and ACI Decay parameters 120 in order to determine the probability of default associated with the loan. The Market to Market LTV parameter is used to adjust the probability in model 100 depending on the Market to Market LTV ratio of the loan. The LTV ratio is the percentage of the amount borrowed relative to the amount at which the purchased property is valued. High OLTV scores indicate a greater risk. For example, where the LTV is greater than 80%, personal mortgage insurance (PMI) is generally required because of the increased risk of default or delinquency. According to an exemplary embodiment, the probability in model 100 decreases with lower LTV ratios and increases with higher LTV ratios.

The Burnout parameter is used to adjust the probability in model 100 depending on the accumulation of past refinance incentives missed by the borrower. Historically, borrowers who consistently pass up favorable refinance opportunities are more likely to default. According to an exemplary embodiment, the Burnout parameter is a measure of the predicted prepayment rate due to only to refinance incentives.

The Macroeconomic Triggers parameter is used to adjust the probability in model 100 depending on various macroeconomic factors or indicators. For example, according to an exemplary embodiment, the Macroeconomic Triggers parameter is based on a house price index and/or an interest rate index in the case of a mortgage loan default model.

The Property Type parameter is used to adjust the probability in model 100 depending on the particular type of property associated with a mortgage loan. For example, according to an exemplary embodiment the probability in model 100 may be adjusted based on whether the property associated with the mortgage loan is a single or multiple unit dwelling, a condominium, a manufactured housing unit, etc.

The Occupancy parameter is used to adjust the probability in model 100 depending on whether the borrower is the intended occupant of the property associated with a mortgage loan. According to an exemplary embodiment, the Occupancy parameter adjusts the probability in model 100 depending on the market to market LTV ratio and whether the mortgage loan is for an investment property.

The Loan Purpose parameter is used to adjust the probability in model 100 depending on whether the mortgage loan is associated with a cash-out refinance transaction. A cash-out refinance is a refinance transaction in which the amount of money received from the new loan exceeds the total of the money needed to repay the existing first mortgage, closing costs, points, and the amount required to satisfy any outstanding subordinate mortgage liens.

The Age Ramp parameter is used to adjust the probability in model 100 depending on the age of the loan since origination. According to an exemplary embodiment, the Age Ramp parameter for unseasoned loans is a function of the term of the loan (e.g., 15 years, 30 years, etc.) and the actual age of the loan since origination, such that the Age Ramp parameter is calculated differently for loans with differing terms and ages since origination.

The ACI Decay parameter is used to adjust the probability in model 100 depending on the decay in the predictive value of an Acquisition Credit Index (ACI) with regard to the probability of default. An exemplary system and method for determining an ACI in connection with a loan is described in greater detail in co-pending U.S. application Ser. No. 10/816,496, filed Apr. 1, 2004 and entitled "Method and System for Assessing Loan Credit Risk and Performance," the entire contents of which are incorporated herein by reference. According to an exemplary embodiment, the ACI Decay parameter for unseasoned loans is a function of only the age of the loan since origination.

For seasoned loans, model 100 utilizes the Market to Market LTV, Burnout, Macroeconomic Triggers, Property Type, Occupancy, and Loan Purpose parameters 110, the Age Ramp and ACI Decay parameters 130, and the Foreclosure, Delinquency, and Bankruptcy parameters 140 shown in FIG. 1 in order to determine the probability of a future default associated with the loan. As with the Age Ramp parameter for unseasoned loans, the Age Ramp parameter for seasoned loans is used to adjust the probability in model 100 depending on the age of the loan since origination, but may be calculated using, for example, different weights or coefficients than those used for the Age Ramp parameter for unseasoned loans. According to an exemplary embodiment, the Age Ramp parameter for seasoned loans is a function of the term of the loan (e.g., 15 years, 30 years, etc.) and the actual age of the loan since origination, such that the Age Ramp parameter is calculated differently for loans with differing terms and ages since origination.

As with the ACI Decay parameter for unseasoned loans, the ACI Decay parameter for seasoned loans is used to adjust the probability in model 100 depending on the decay in the predictive value of an ACI with regard to the probability of the adverse event. In the case of seasoned loans, however, the ACI Decay parameter is further used to adjust the probability in model 100 depending on the delinquency status of the loan at the time the probability is determined, as delinquency status information is generally available for seasoned loans. The predictive value of an ACI with regard to the probability of future default for a mortgage loan may typically decrease as a loan falls further into delinquency. According to an exemplary embodiment, the ACI Decay parameter for seasoned loans is a function of the age of the loan since origination, and the number of months the loan is delinquent at the time the probability is determined.

The Delinquency and Bankruptcy parameters 140 shown in FIG. 1 are used in model 100 for seasoned loans in order to determine the probability of a future default associated with the mortgage loan. The Delinquency and Bankruptcy parameters 140 are utilized in model 100 because they are typically the main factors in predicting defaults in seasoned mortgage loans. The Delinquency parameter is used to adjust the probability of a future default in model 100 based on the delinquency status of the mortgage loan at the time the probability is determined. The term "delinquency" as used herein refers to the failure of borrower to make timely payments specified under a loan agreement. The Bankruptcy parameter is used to adjust the probability of a future default in model 100 based on the bankruptcy status of a borrower associated with the mortgage loan at the time the probability is determined.

Model 100 is configured to use Delinquency and Bankruptcy parameters 140 to determine the probability of a future default for a seasoned mortgage loan without requiring separate transition models to determine future delinquencies or bankruptcies before determining the probability of a future default. The probability of default determined by model 100 is instead dependent on the delinquency status and bankruptcy status of the mortgage loan at the time of these status observations are made and the probability of default is determined. Model 100 characterizes the decay in the information contained in the delinquency status and bankruptcy status of the mortgage loan over time in order to characterize the evolution of possible future defaults for the loan over time. For example, different delinquency status observations may typically lead to different default paths that converge over a period of approximately three years as the default forecast moves forward and the information in the initial delinquency observation ages with respect to the default forecast. In general, peaks in default rates may be more pronounced and occur earlier for loans that have fallen deeper into delinquency. Similarly, given a serious delinquency, borrowers in bankruptcy may tend to default less frequently than borrowers not in bankruptcy for a period immediately following the bankruptcy status observation, leading to different default paths that converge over a period of approximately twelve months subsequent to the bankruptcy status observation.

As stated above, in order to characterize the decay in the information contained in the delinquency status and the bankruptcy status observations over time, model 100 determines Delinquency and Bankruptcy parameters 140 for the mortgage loan based on the delinquency status and the bankruptcy status observations for the mortgage loan. The delinquency status observation is the level of delinquency of the loan at the time when the probability of default is determined (i.e., when the initial delinquency status is observed). Any suitable number of delinquency levels may be used in the measure of delinquency (e.g., number of months, etc.). To simplify determination of the Delinquency parameter, model 100 may associate the delinquency status observation with one of several range categories in order to determine the Delinquency parameter 140. According to an exemplary embodiment, model 100 uses eight different levels of delinquency to determine the Delinquency parameter from the delinquency status observation (shown, for example, in FIG. 6). These levels include: zero months delinquent with no delinquencies in the last twelve months; zero months delinquent with at least one delinquency in the last twelve months; one month delinquent; two months delinquent; three months delinquent; four to six months delinquent; seven to nine months delinquent; and nine or more months delinquent.

The bankruptcy status observation is the bankruptcy status of a borrower associated with the mortgage loan at the time the probability is determined (i.e., when the initial bankruptcy status is observed). According to an exemplary embodiment, the bankruptcy status indicates whether the borrower associated with the mortgage loan has filed for bankruptcy within the last twelve months and the loan is ninety or more days delinquent. In this embodiment, model 100 uses two levels of bankruptcy to determine the Bankruptcy parameter from the bankruptcy status observation (shown, for example, in FIG. 6). A first level indicates that the borrower associated with the mortgage loan has filed for bankruptcy within the last twelve months and the loan is ninety or more days delinquent; and a second level indicates that either the borrower associated with the mortgage loan has not filed for bankruptcy within the last twelve months and/or the loan is not ninety or more days delinquent.

Model 100 also determines Delinquency and Bankruptcy parameters 140 for the mortgage loan based on the amount of time (referred to herein as the "forecast time") between the time when the probability of default is determined (i.e., when the delinquency and bankruptcy statuses are observed) and the time in the future for which the default is to be forecast. According to an exemplary embodiment, model 100 associates the forecast time with one of several range categories in order to determine Delinquency and Bankruptcy parameters 140. For example, in order to determine the Delinquency parameter, model 100 may associate the forecast time with one of nine range categories (shown, for example, in FIG. 6) including: zero to two months; two to six months; six to nine months; nine to twelve months; twelve to eighteen months; eighteen to twenty-four months; twenty-four to thirty months; thirty to thirty-six months, and over thirty-six months. Similarly, in order to determine the Bankruptcy parameter, model 100 may associate the forecast time with one of five range categories including: zero to two months; two to six months; six to nine months; nine to twelve months; and over twelve months.

Figure 2:
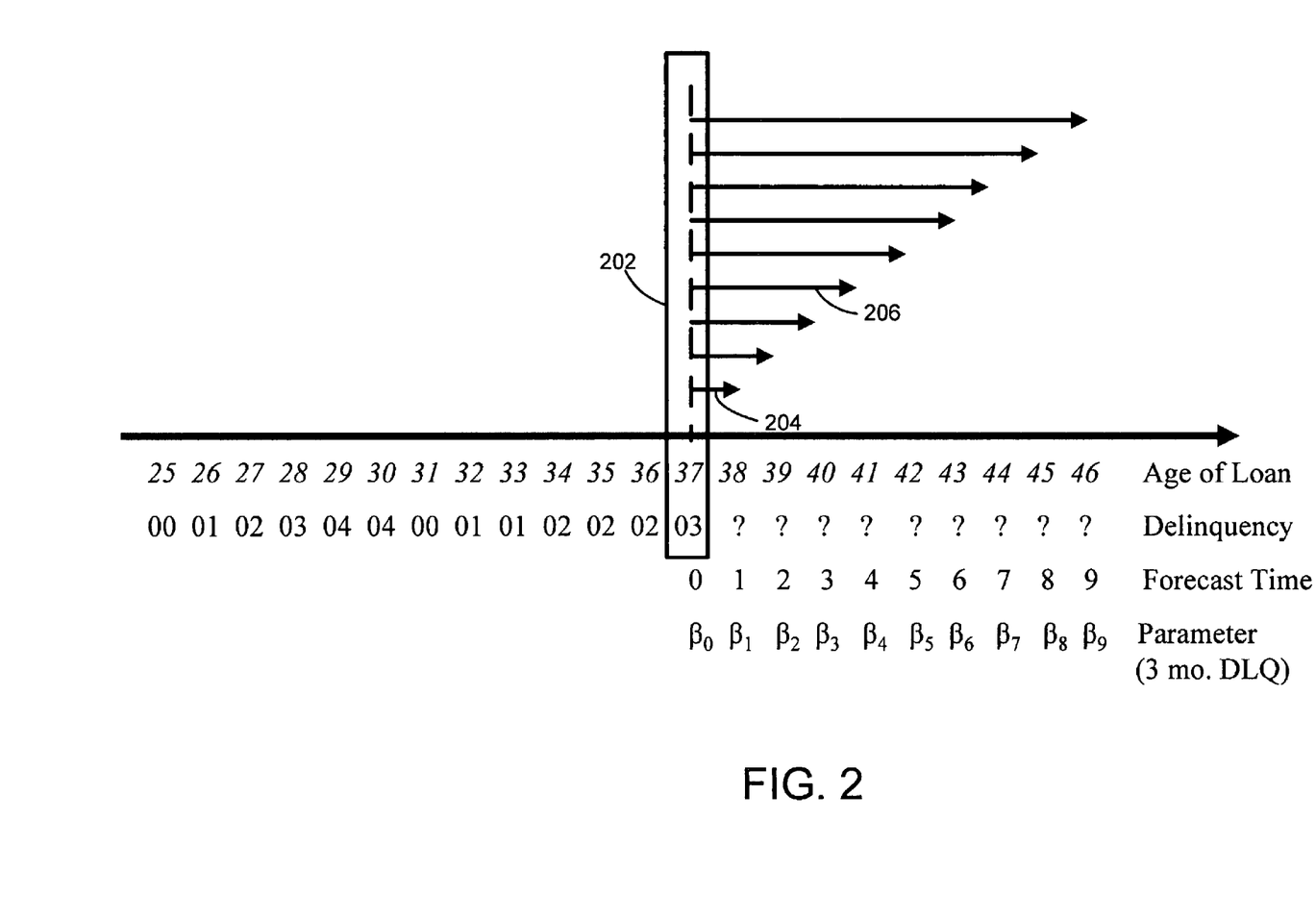
FIG. 2 diagrammatically illustrates the temporal relationship between the delinquency status observation and the forecast time in according to an exemplary embodiment.

FIG. 2 diagrammatically illustrates the temporal relationship between the delinquency status observation and the forecast time according to an exemplary embodiment. In FIG. 2 a delinquency status observation 202 is shown for a seasoned mortgage loan aged 36 months. Delinquency status observation 202 indicates that at the time of the observation, i.e., month 37, the mortgage loan is delinquent by three months. Accordingly, model 100 would use a delinquency status of three months delinquent to determine the Delinquency parameter. Various forecast times are show in FIG. 2 which correspond to the progression of future default probabilities for the mortgage loan based on delinquency status observation 202. For example, a forecast time 204 of one month would be used to determine the Delinquency parameter in model 100 for the probability of a default associated with the mortgage loan as of month 38, which is the amount of time between delinquency status observation 202 in month 37 and the time in the future for which the default is to be forecast, i.e., month 38. Similarly, a forecast time 206 of four months would be used to determine the Delinquency parameter in model 100 for the probability of a default associated with the mortgage loan as of month 41.

The delinquency status of three months from delinquency status observation 202 is used in model 100 for both forecast time 204 and forecast time 206 in order to determine the associated probabilities of default. To account for the difference in forecast times and to characterize the corresponding decay in the delinquency status information in delinquency status observation 202, a different Delinquency parameter is determined for each probability of future default. For example, as shown in FIG. 2, based on delinquency status observation 202 of a three-month delinquency in month 37 and a forecast time of one month, a Delinquency parameter $\beta_1$ is used in model 100 in order to determine the probability of a default associated with the mortgage loan in month 38. Similarly, based on delinquency status observation 202 of a three-month delinquency in month 37 and a forecast time of four months, a Delinquency parameter $\beta_4$ is used in model 100 in order to determine the probability of a default associated with the mortgage loan in month 41.

Model 100 may also be configured to use foreclosure data for the mortgage loan, including the speed of foreclosure for the particular state in which the mortgage loan was originated in order to determine the Delinquency parameter. The mean foreclosure speed for mortgage foreclosures in the state of origination may have an impact on the timing of defaults.

According to an exemplary embodiment, model 100 is configured to determine the Delinquency parameter based on whether the particular state of origination for the mortgage is a "fast" foreclosure state or a "slow" foreclosure state relative to an average foreclosure speed of all fifty states in the United States. According to other exemplary embodiments, different groupings or ranges of foreclosure speeds are used to determine the Delinquency parameter.

In order to characterize the decay in the information contained in the delinquency status and the bankruptcy status observations over time, Delinquency and Bankruptcy parameters 140 are based on estimates of the predictive value of the delinquency status and the bankruptcy status with regard to the possible default associated with the mortgage loan at the time in the future for which the default is to be forecast. According to an exemplary embodiment, the parameter estimates are generated using a random sampling process to analyze delinquency, bankruptcy, and default information for a historical grouping of similar mortgage loans having sufficient payment histories. The random sampling process involves making delinquency status and default observations based on random forecast times each loan in the group of loans.

Figure 3:
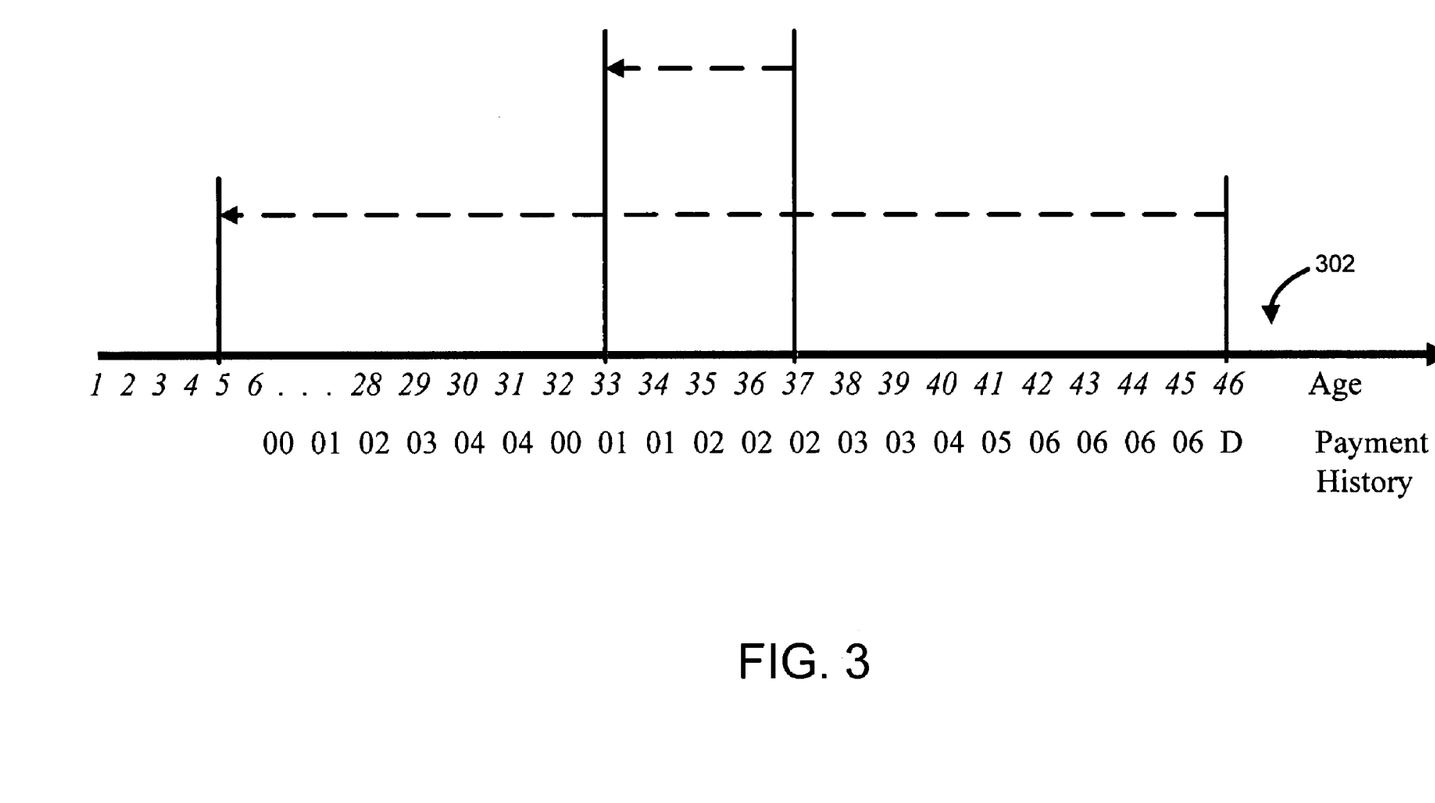
FIG. 3 illustrates a random sampling scheme according to an exemplary embodiment.

FIG. 3 illustrates a random sampling scheme according to an exemplary embodiment. As shown in FIG. 3, for several months or other payment increments in the age of each loan in the group of loans, the actual payment status of the loan is observed, and a random forecast time is selected. The random forecast time is subtracted from the age month in order to determine a previous age month for which a delinquency status observation is made. For example, FIG. 3 shows a timeline 302 which depicts respective age months and payment history information for a mortgage loan in a pool of mortgage loans containing historical data to be used in the random sampling scheme. For month 46 the payment status of the loan indicates that the loan was in default. This observation is recorded and a random forecast time of 41 months is selected, placing the delinquency status observation at month 5. In this case, the delinquency status observation is zero months delinquent because the loan had no payment information in month 5 and was still unseasoned. This information is also recorded. For month 37, the payment status of the loan indicates that the loan was two months delinquent. This observation is recorded and a random forecast time of 4 months is selected, placing the delinquency status observation at month 33. In this case, the delinquency status observation is one month delinquent. This information is also recorded.

Figure 4:
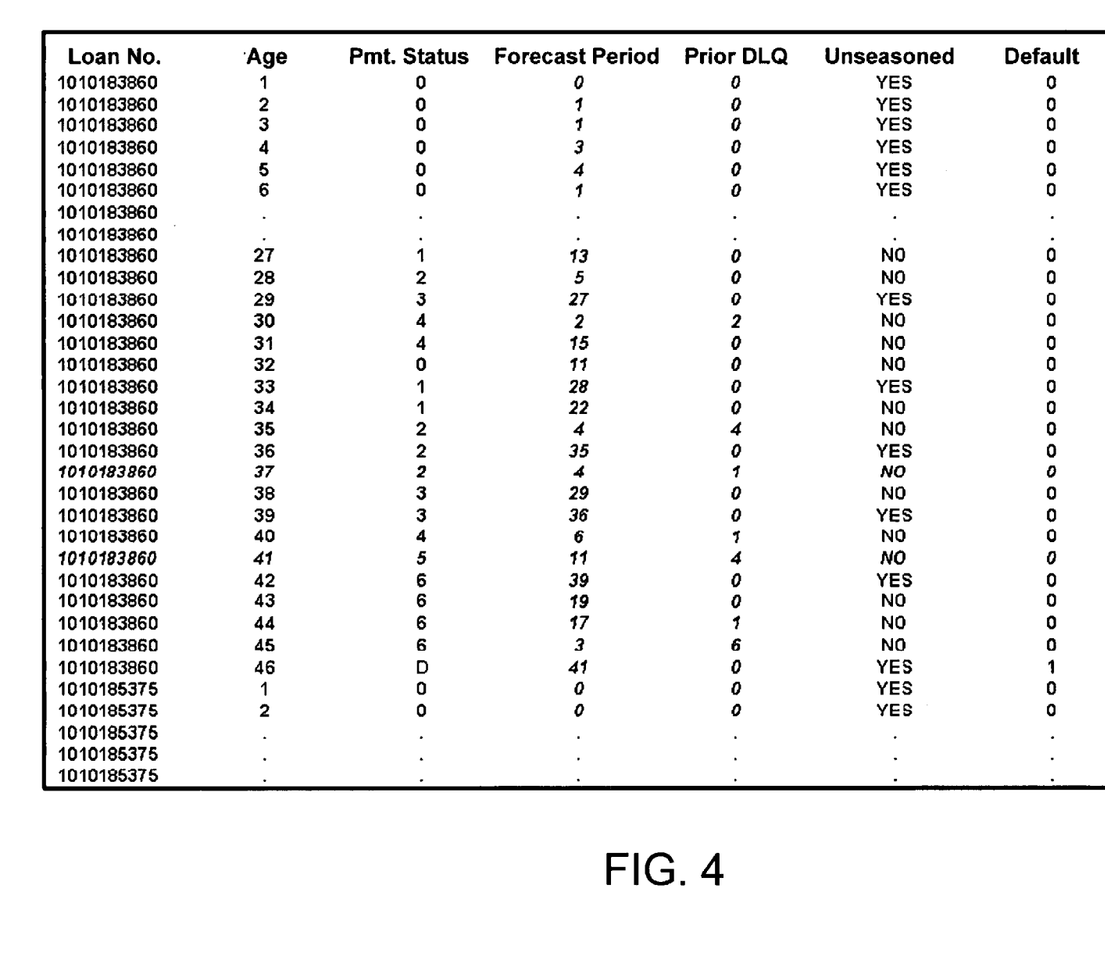
FIG. 4 illustrates an exemplary estimation data set for a mortgage loan acquired using the random sampling scheme shown in FIG. 3.

This random sampling process is repeated for several or all months in the age and payment history of each loan in the group of loans until the desired sample size is obtained. FIG. 4 illustrates an exemplary estimation data set for a mortgage loan acquired using the random sampling scheme shown in FIG. 3. FIG. 4 shows the observations described with reference to FIG. 3 for age months 46 and 37. For example, the default status of this loan in month 46 is reflected in both the "Pmt. Status" and "Default" columns. The random forecast time of 41 months and the delinquency status of zero months are shown in the respective "Forecast Period" and "Prior Delinquency" columns. The unseasoned status of the mortgage loan at the time of the prior delinquency status observation is indicated in the "Unseasoned" column. Similarly, the two-month delinquent status of this loan in month 37 is reflected in the "Pmt. Status" and "Default" columns (i.e. by a zero in the "Default" column). The random forecast time of 4 months and the delinquency status of one month are shown in the respective "Forecast Period" and "Prior Delinquency" columns. The seasoned status of the mortgage loan at the time of the prior delinquency status observation is indicated in the "Unseasoned" column.

Figure 5:
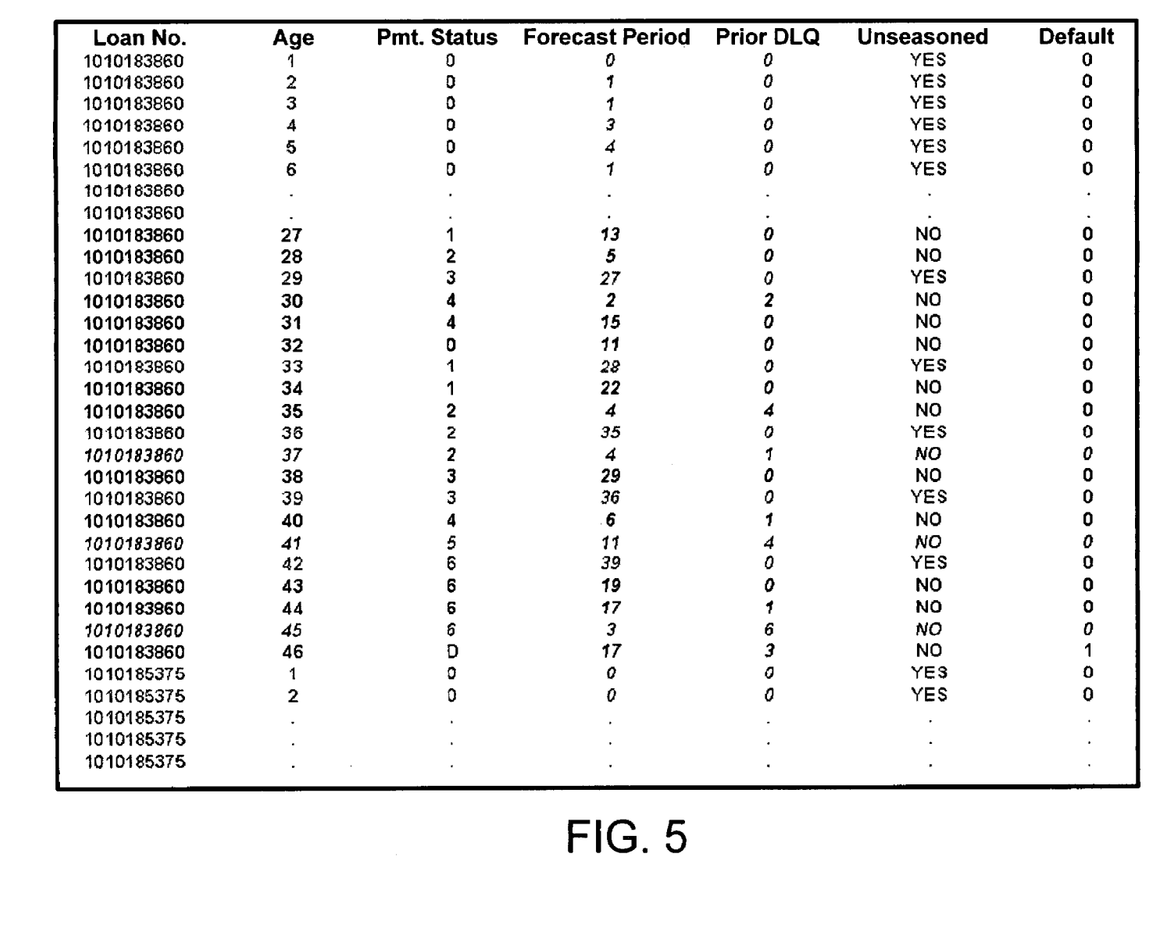
FIG. 5 illustrates the exemplary estimation data set of FIG. 4 with data for the unseasoned observations removed.

According to an exemplary embodiment, all unseasoned observations are removed from the estimation data set before estimates are generated. FIG. 5 illustrates the exemplary estimation data set of FIG. 4 with data for the unseasoned observations removed.

Using the estimation data set, the relationship between the delinquency status of the loan at the beginning of the forecast time and the payment status of the loan at the end of forecast time can be determined for several different ages and forecast periods. In this way, for each age month of the loan, the sampling scheme randomly looks back to the delinquency status of the loan for a prior month. The observations from the random sampling scheme for several loans may then be used to generate estimates of the predictive value of a particular delinquency status observation for a seasoned mortgage loan with regard to a possible default associated with the mortgage loan at a time in the future for which the default is to be forecast.

Figure 6:
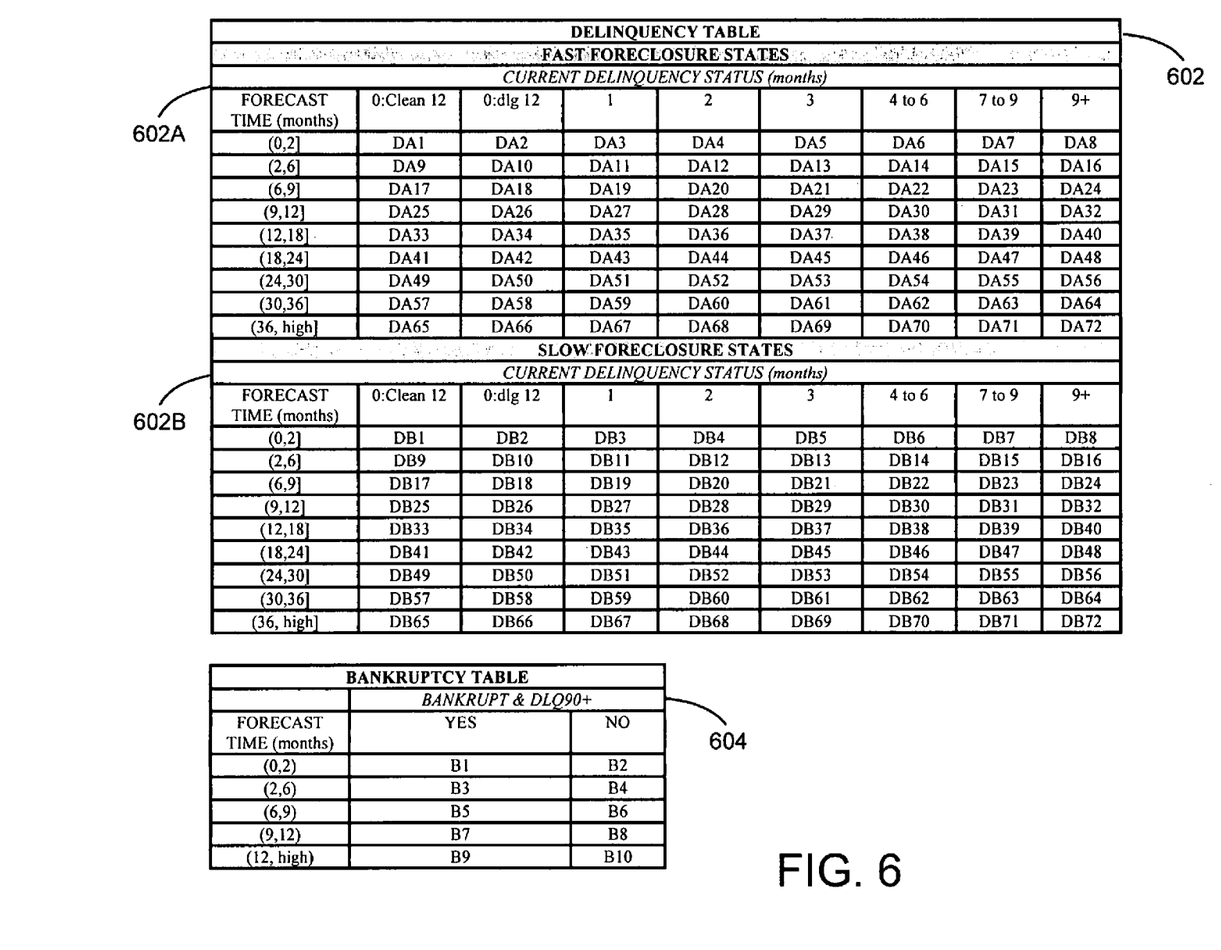
FIG. 6 illustrates a predetermined table of Delinquency parameters and a predetermined table of Bankruptcy parameters according to an exemplary embodiment.

According to an exemplary embodiment, the estimates generated by the random sampling scheme may be incorporated into model 100 in the form of a predetermined "look-up" table of parameters. For example, FIG. 6 illustrates a predetermined table of Delinquency parameters 602 and a predetermined table of Bankruptcy parameters 604 according to an exemplary embodiment. Table 602 may generally be used by model 100 to determine a Delinquency parameter for a mortgage loan given a delinquency status observation and a forecast time. In the illustrated embodiment, table 602 is further divided into a table 602A for mortgage loans originated in "fast" foreclosure states and a table 602B for mortgage loans originated in "slow" foreclosure states as described above.

Tables 602A and 602B are each divided into a number of columns, wherein a column is included for each possible delinquency status level for the mortgage loan. In the illustrated embodiment, tables 602A and 602B each include eight columns corresponding to eight possible delinquency levels. These levels include: zero months delinquent with no delinquencies in the last twelve months; zero months delinquent with at least one delinquency in the last twelve months; one month delinquent; two months delinquent; three months delinquent; four to six months delinquent; seven to nine months delinquent; and nine or more months delinquent. In other embodiments, additional or fewer delinquency status levels may be used.

Tables 602A and 602B are also each divided into a number of rows, wherein a row is included for each of several range categories used to associated a forecast time for a mortgage loan with a Delinquency parameter. In the illustrated embodiment, tables 602A and 602B each include nine rows corresponding to nine possible range categories for the forecast time. These levels include: zero to two months; two to six months; six to nine months; nine to twelve months; twelve to eighteen months; eighteen to twenty-four months; twenty-four to thirty months; thirty to thirty-six months, and over thirty-six months. Similarly, in order to determine the Bankruptcy parameter, model 100 may associate the forecast time with one of five range categories including: zero to two months; two to six months; six to nine months; nine to twelve months; and over twelve months. In other embodiments, additional or fewer forecast time range categories may be used.

Table 604 may generally be used by model 100 to determine a Bankruptcy parameter for a mortgage loan given a bankruptcy status observation and a forecast time. Table 604 is divided into a number of columns, wherein a column is included for each possible bankruptcy status for the mortgage loan. In the illustrated embodiment, table 604 includes two columns, wherein the first column corresponds to a "Yes" status indicating that the borrower associated with the mortgage loan has filed for bankruptcy within the last twelve months and the loan is ninety or more days delinquent. The second column corresponds to a "No" status indicating that the borrower associated with the mortgage loan has not filed for bankruptcy within the last twelve months and/or the loan is not ninety or more days delinquent.

Table 604 is also divided into a number of rows, wherein a row is included for each of several range categories used to associated a forecast time for a mortgage loan with a Bankruptcy parameter. In the illustrated embodiment, tables 602A and 602B each include five rows corresponding to five possible range categories for the forecast time. These levels include: zero to two months; two to six months; six to nine months; nine to twelve months; and over twelve months.

Figure 7:
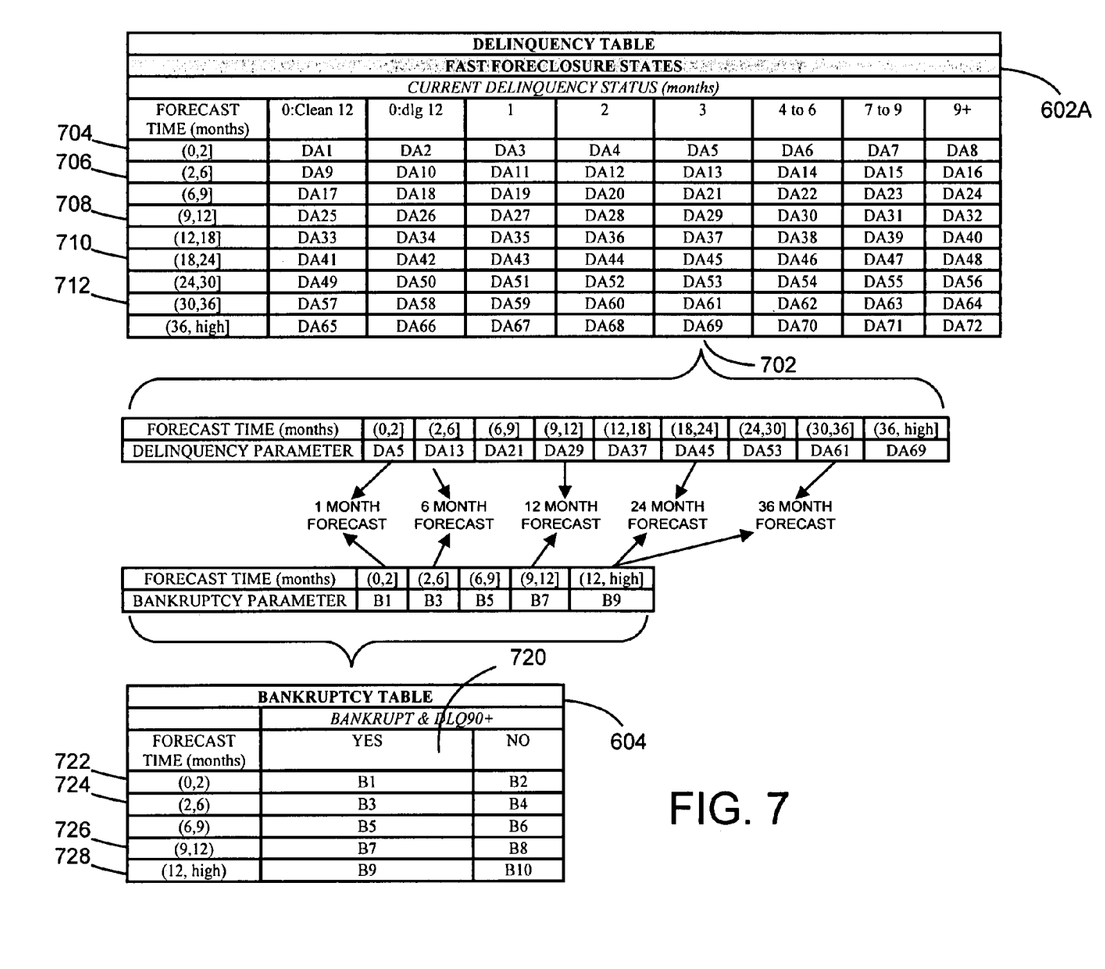
FIG. 7 illustrates the determination of a Delinquency parameter and a Bankruptcy parameter for a mortgage loan from the tables shown in FIG. 6 according to an exemplary embodiment.

FIG. 7 illustrates the determination of a Delinquency parameter and a Bankruptcy parameter for a mortgage loan from the tables shown in FIG. 6 according to an exemplary embodiment. The example of FIG. 7 is based on delinquency status data, bankruptcy status data, and foreclosure data for a seasoned mortgage loan with thirty-six months of payment history. The delinquency status data indicates that the mortgage loan is currently three months delinquent and the foreclosure status data indicates that the mortgage was originated in a "fast" foreclosure state. Accordingly, a column 702 for a three-month delinquency in table 602A (i.e., the "fast" foreclosure state table) is used, as shown in FIG. 7.

The particular Delinquency parameter to be used from column 702 depends on the desired forecast time. For example, FIG. 7 illustrates the corresponding Delinquency parameter to be used as the default forecast moves forward for five different forecast times. A Delinquency parameter DA5 is used for a forecast time of one month ahead, which corresponds to the intersection of column 702 and a row 704 corresponding to a forecast time of zero to two months. A Delinquency parameter DA13 is used for a forecast time of six months ahead, which corresponds to the intersection of column 702 and a row 706 corresponding to a forecast time of two to six months. A Delinquency parameter DA29 is used for a forecast time of twelve months ahead, which corresponds to the intersection of column 702 and a row 708 corresponding to a forecast time of nine to twelve months. A Delinquency parameter DA45 is used for a forecast time of twenty-four months ahead, which corresponds to the intersection of column 702 and a row 710 corresponding to a forecast time of eighteen to twenty-four months. A Delinquency parameter DA61 is used for a forecast time of thirty-six months ahead, which corresponds to the intersection of column 702 and a row 712 corresponding to a forecast time of thirty to thirty-six months.

The bankruptcy status data indicates that the borrower associated with the mortgage loan has filed for bankruptcy within the last twelve months and the loan is ninety or more days delinquent. Accordingly, a column 720 for a bankruptcy status of "yes" is used, as shown in FIG. 7. The particular Bankruptcy parameter to be used from column 720 also depends on the desired forecast time. For example, FIG. 7 illustrates the corresponding Bankruptcy parameter to be used as the default forecast moves forward for five different forecast times. A Bankruptcy parameter B1 is used for a forecast time of one month ahead, which corresponds to the intersection of column 720 and a row 722 corresponding to a forecast time of zero to two months. A Delinquency parameter B3 is used for a forecast time of six months ahead, which corresponds to the intersection of column 720 and a row 724 corresponding to a forecast time of two to six months. A Delinquency parameter B7 is used for a forecast time of twelve months ahead, which corresponds to the intersection of column 720 and a row 726 corresponding to a forecast time of nine to twelve months. A Delinquency parameter B9 is used for a forecast time of twenty-four months ahead, which corresponds to the intersection of column 702 and a row 728 corresponding to a forecast time of over twelve months. Delinquency parameter B9 is also used for a forecast time of thirty-six months ahead, which similarly corresponds to the intersection of column 702 and row 728.

Figure 8:
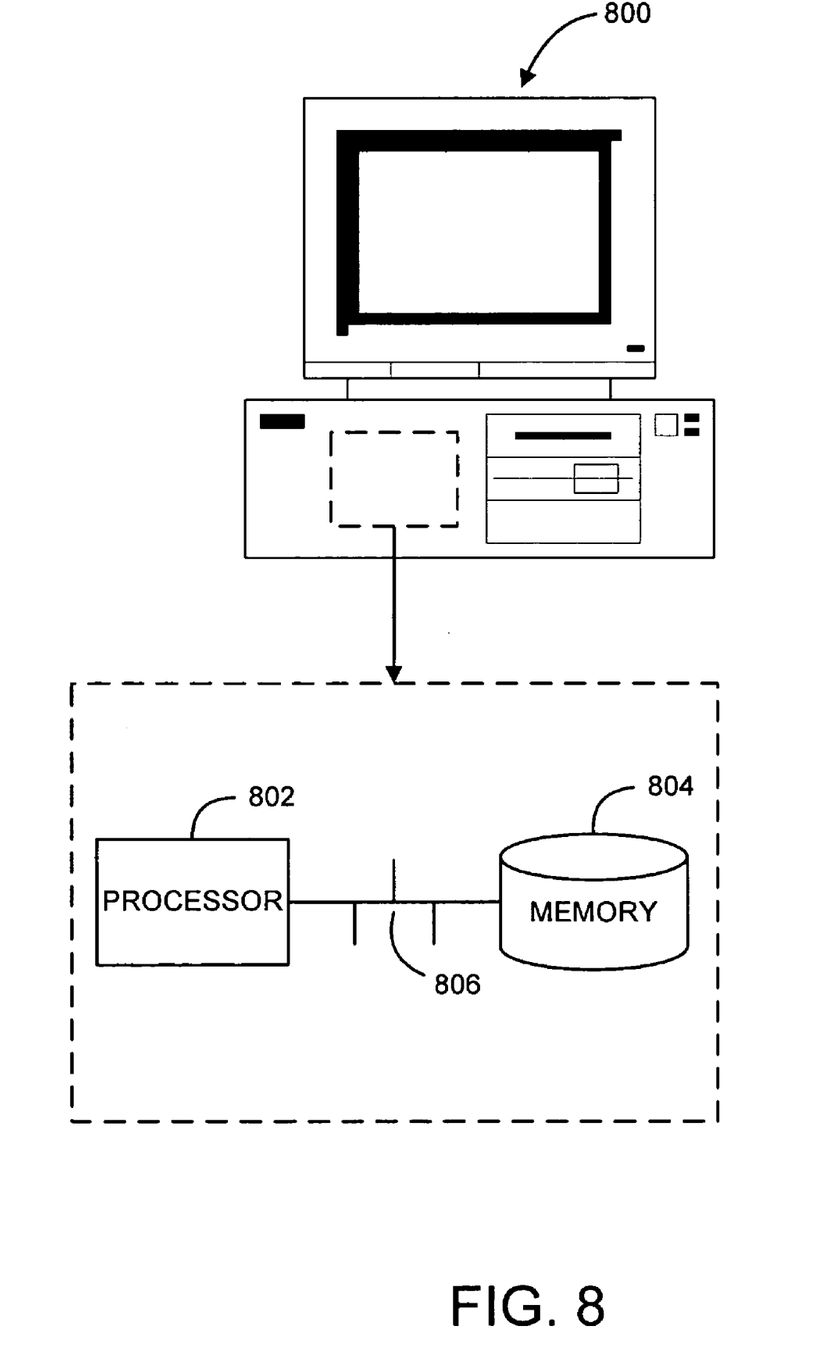
FIG. 8 illustrates an exemplary computer system for evaluating credit risk associated with a loan.

An exemplary system for implementing the method and system for evaluating credit risk associated with a financial asset might include a general purpose computing device in the form of a conventional computer 800, including a processing unit 802, a system memory 804, and a system bus 806 that couples various system components including the system memory 804 to the processing unit 802 as shown in FIG. 8. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments has been presented for purposes of illustration and description. It is not intended to be exhaustive or to be limited to the precise forms disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. A system for evaluating credit risk associated with a mortgage loan, the system comprising:
    memory configured to store a delinquency status observation for the mortgage loan and a bankruptcy status observation for the mortgage loan, and corresponding to a first date; and
    a processor coupled to the memory and operable to execute programmed instructions stored in the memory, wherein the programmed instructions are configured to:
    determine a delinquency parameter value using the delinquency status observation for the mortgage loan and the amount of time between the first date and a second date, wherein the delinquency parameter is based on an estimate of a decrease in a predictive value of the delinquency status observation with regard to a possible adverse event associated with the mortgage loan on the second date;
    determine a bankruptcy parameter value using a bankruptcy status observation for the mortgage loan and the amount of time between the first date and the second date, wherein the bankruptcy parameter is based on an estimate of a decrease in the predictive value of the bankruptcy status observation with regard to the possible adverse event associated with the mortgage loan on the second date; and
    determine a probability of the adverse event as a function of the delinquency parameter and the bankruptcy parameter.

2. The method of claim 1, wherein determining the delinquency and bankruptcy parameters includes using a mathematical model to determine the delinquency and bankruptcy parameters, and wherein the mathematical model includes a plurality of predetermined delinquency and bankruptcy parameters.

3. The method of claim 2, wherein the mathematical model further uses foreclosure data including the state in which the mortgage loan was originated in order to determine the delinquency parameter.

4. The method of claim 1, wherein the adverse event is one of default and prepayment.

5. A system for evaluating credit risk associated with a mortgage loan, the system comprising:
    memory configured to store received data regarding the mortgage loan and corresponding to a first date; and
    a processor coupled to the memory and operable to execute programmed instructions stored in the memory, wherein the programmed instructions are configured to:
    determine a parameter using the received data and the amount of time between the first date and a second date to select the parameter from a plurality of predetermined parameters included in a mathematical model, wherein the parameter is based on an estimate of a predictive value of the received data with regard to a possible adverse event associated with the mortgage loan on the second date, and wherein the plurality of predetermined parameters are generated by sampling at least one of a delinquency status and a bankruptcy status from a plurality of mortgage loans at the beginning of a time interval, and by sampling a payment status of each of the plurality of mortgage loans with regard to the adverse event at the end of the time interval in order to estimate the predictive value of the sampled at least one of a delinquency status and a bankruptcy status with regard to the adverse event; and
    determining a probability of the adverse event as a function of the parameter.

6. The system of claim 5, wherein the received data further includes foreclosure data regarding the mortgage loan including the state in which the mortgage loan was originated.

7. The system of claim 5, wherein the adverse event is a default associated with the mortgage loan.

8. The system of claim 5, wherein the adverse event is a prepayment associated with the mortgage loan.

* * * * *